(12) United States Patent
Croft et al.

(10) Patent No.: US 9,274,671 B2
(45) Date of Patent: Mar. 1, 2016

(54) MANAGING A USER INTERFACE FOR AN APPLICATION PROGRAM

(75) Inventors: Michael R. Croft, Hampshire (GB); Philip Jones, Winchester (GB); Adam R. Rice, Winchester (GB); Matthew Whitbourne, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/820,820

(22) PCT Filed: Aug. 23, 2011

(86) PCT No.: PCT/EP2011/064486
§ 371 (c)(1),
(2), (4) Date: Aug. 23, 2013

(87) PCT Pub. No.: WO2012/031892
PCT Pub. Date: Mar. 15, 2012

(65) Prior Publication Data
US 2013/0326413 A1  Dec. 5, 2013

(30) Foreign Application Priority Data
Sep. 6, 2010 (EP) .................................... 10175487

(51) Int. Cl.
*G06F 3/0481* (2013.01)
*G06F 3/0482* (2013.01)
*G06F 9/44* (2006.01)

(52) U.S. Cl.
CPC ............ *G06F 3/0481* (2013.01); *G06F 3/0482* (2013.01); *G06F 9/4446* (2013.01)

(58) Field of Classification Search
CPC ........................................................ G06F 3/0481
USPC ............................................................. 715/811
See application file for complete search history.

(56) References Cited

U.S. PATENT DOCUMENTS

| 5,115,501 | A |   | 5/1992  | Kerr |
| 6,121,968 | A | * | 9/2000  | Arcuri et al. ............... 715/825 |
| 6,621,532 | B1| * | 9/2003  | Mandt .......................... 348/841 |
| 6,823,344 | B1|   | 11/2004 | Isensee et al. |
| 6,981,242 | B2|   | 12/2005 | Lehmeier et al. |
| 7,620,894 | B1|   | 11/2009 | Kahn |
| 2005/0015728 | A1 | | 1/2005 | Ragan, Jr. et al. |

(Continued)

FOREIGN PATENT DOCUMENTS

| CN | 1455611 A | 11/2003 |
| EP | 0269364   | 6/1988  |

(Continued)

OTHER PUBLICATIONS

PCT International Search Report and Written Opinion, PCT/EP2011/064486, Jan. 12, 2012, 11 pages.

*Primary Examiner* — Andrea Leggett
(74) *Attorney, Agent, or Firm* — Yee & Associates, P.C.; Parashos Kalaitzis

(57) ABSTRACT

A method, apparatus and computer program is disclosed for managing a user interface (UI) for an application program in which a plurality of user interface methods are provided for a given application program function, one or more of the more frequently used UI options being maintained in the UI while one or more of the less frequently used UI options are removed.

13 Claims, 4 Drawing Sheets

(56) References Cited

U.S. PATENT DOCUMENTS

2005/0118996 A1  6/2005  Lee et al.
2009/0158167 A1  6/2009  Wang et al.

FOREIGN PATENT DOCUMENTS

EP      1359495 A2   11/2003
WO      99/66394     12/1999

* cited by examiner

| Function | Method | Age | Uses | Active |
|---|---|---|---|---|
| Save | Menu | 3 | 5 | Active |
| Save | Shortcut | 3 | 1 | Active |
| Save | Toolbar | 3 | 2 | Always Active |
| Print | Menu | 2 | 1 | Inactive |
| Print | Shortcut | 1 | 5 | Inactive |
| Print | Toolbar | 1 | 0 | Always Active |
| | | | | Inactive |

Figure 3

MANAGING A USER INTERFACE FOR AN APPLICATION PROGRAM

FIELD OF INVENTION

The present invention relates to a method, apparatus or computer program for managing a user interface for an application program.

BACKGROUND OF THE INVENTION

Computer programs such as application programs are commonly provided with a user interface (UI) to enable user interaction with the computer program. Each function provided by the computer program is represented as an option in the UI for user selection as appropriate. As the complexity and number of functions provided by a program increase, the number of options in the UI can correspondingly increase. Furthermore, a UI may be arranged provide two or more UI options for a user to select a single program function. For example, a UI may provide a drop-down menu option, keyboard shortcut, toolbar option or touch gesture all for selecting a specific program function. Thus, the increased complexity of the UI can make UI options difficult to find, obscure UI options altogether or make UI options difficult to discover.

SUMMARY OF THE INVENTION

The present invention accordingly provides, in a first aspect, a method for managing a user interface for an application program, said method comprising the steps of:
identifying a plurality of user interface methods, each user interface method being arranged for selecting a first function in an application program; recording usage data representing use of each said user interface method; analyzing said usage data so as to identify the frequency of use of each said user interface method; and maintaining the most frequently used user interface method in said interface and removing one or more less frequently used user interface methods in said interface.

Preferably, said plurality of user interface methods comprises one or more graphical user interface methods. Preferably, said plurality of user interface methods comprises one or more non-graphical user interface methods that are permanently maintained in said user interface. Preferably, a predetermined body of usage data is recorded prior to enabling said analyzing of said usage data and said maintaining of said the most frequently used user interface method. Preferably, said usage data is recorded for a predetermined period prior to enabling said analyzing of said usage data and said maintaining of said the most frequently used user interface method. Preferably, said analyzing of said usage data and said maintaining of said the most frequently used user interface method is performed automatically on start up of said application program Preferably, said analyzing of said usage data and said maintaining of said the most frequently used user interface method is performed periodically during the operation of said application program. Preferably, said frequency of use is determined by the average uses of a given user interface method per use of said application program. Preferably, a plurality of said most frequently used user interface methods are maintained in said user interface. Preferably, a predetermined proportion of said most frequently used user interface methods are maintained in said user interface. Preferably, each user interface method having a frequency of use above a predetermined usage threshold is maintained in said user interface. Preferably, said first function is user selectable. Preferably, said usage data is analysed so as to identify one or more unused user interface methods and one or more of said unused user interface methods are presented for use to said user. Preferably, one or more of said unused user interface methods are presented in place of said removed user interface methods in said interface.

Preferably, said maintaining of said most frequently used user interface method in said interface and removing of one or more less frequently used user interface methods in said interface is performed automatically. Preferably, said maintaining of said most frequently used user interface method in said interface and removing of one or more less frequently used user interface methods in said interface is performed under user control.

In a second aspect, there is provided an apparatus for managing a user interface for an application program, said apparatus being operable to: identify a plurality of user interface methods, each user interface method being arranged for selecting a first function in an application program; record usage data representing use of each said user interface method;
analyze said usage data so as to identify the frequency of use of each said user interface method; and maintain the most frequently used user interface method in said interface and remove one or more less frequently used user interface methods in said interface.

Preferably, said plurality of user interface methods comprises one or more graphical user interface methods. Preferably, said plurality of user interface methods comprises one or more non-graphical user interface methods that are permanently maintained in said user interface. Preferably, a predetermined body of usage data is recorded prior to enabling said analyzing of said usage data and said maintaining of said the most frequently used user interface method. Preferably, said usage data is recorded for a predetermined period prior to enabling said analyzing of said usage data and said maintaining of said the most frequently used user interface method. Preferably, said analyzing of said usage data and said maintaining of said the most frequently used user interface method is performed automatically on start up of said application program Preferably, said analyzing of said usage data and said maintaining of said the most frequently used user interface method is performed periodically during the operation of said application program. Preferably, said frequency of use is determined by the average uses of a given user interface method per use of said application program. Preferably, a plurality of said most frequently used user interface methods are maintained in said user interface. Preferably, a predetermined proportion of said most frequently used user interface methods are maintained in said user interface. Preferably, each user interface method having a frequency of use above a predetermined usage threshold is maintained in said user interface. Preferably, said first function is user selectable. Preferably, said usage data is analysed so as to identify one or more unused user interface methods and one or more of said unused user interface methods are presented for use to said user. Preferably, one or more of said unused user interface methods are presented in place of said removed user interface methods in said interface.

Preferably, said maintaining of said most frequently used user interface method in said interface and removing of one or more less frequently used user interface methods in said interface is performed automatically. Preferably, said maintaining of said most frequently used user interface method in said interface and removing of one or more less frequently used user interface methods in said interface is performed under user control.

In a third aspect, there is provided a computer program stored on a computer readable medium and loadable into the internal memory of a digital computer, comprising software code portions, when said program is run on a computer, for performing the method of the first aspect.

An embodiment of the invention provides a method for managing a user interface for an application program, the method comprising the steps of:

identifying a plurality of user interface methods, each user interface method being arranged for selecting a first function in an application program;

recording usage data representing use of each user interface method;

analyzing the usage data so as to identify the frequency of use of each user interface method; and maintaining the most frequently used user interface method in the interface and removing one or more less frequently used user interface methods in the interface.

The plurality of user interface methods may comprise one or more graphical user interface methods. The plurality of user interface methods may comprise one or more non-graphical user interface methods that are permanently maintained in the user interface. A predetermined body of usage data may be recorded prior to enabling the analyzing of the usage data and the maintaining of the most frequently used user interface method. The usage data may be recorded for a predetermined period prior to enabling the analyzing of the usage data and the maintaining of the most frequently used user interface method. The analyzing of the usage data and the maintaining of the most frequently used user interface method may be performed automatically on start up of the application program. The analyzing of the usage data and the maintaining of the most frequently used user interface method may be performed periodically during the operation of the application program.

The frequency of use may determined by the average uses of a given user interface method per use of the application program. The most frequently used user interface methods may be maintained in the user interface. A predetermined proportion of the most frequently used user interface methods may be maintained in the user interface. Each user interface method having a frequency of use above a predetermined usage threshold may be maintained in the user interface. The first function may be user selectable. The usage data may be analysed so as to identify one or more unused user interface methods and one or more of the unused user interface methods are presented for use to the user. One or more of the unused user interface methods may be presented in place of the removed user interface methods in the interface. The maintaining of the most frequently used user interface method in the interface and removing one or more less frequently used user interface methods in the interface may be performed automatically. The maintaining of the most frequently used user interface method in the interface and removing of one or more less frequently used user interface methods in the interface may be performed under user control.

Another embodiment provides apparatus for managing a user interface for an application program, the apparatus being operable to:

identify a plurality of user interface methods, each user interface method being arranged for selecting a first function in an application program;

record usage data representing use of each user interface method;

analyze the usage data so as to identify the frequency of use of each user interface method; and maintain the most frequently used user interface method in the interface and remove one or more less frequently used user interface methods in the interface.

A further embodiment provides a computer program stored on a computer readable medium and loadable into the internal memory of a digital computer, comprising software code portions, when the program is run on a computer, for performing a method for managing a user interface for an application program, the method comprising the steps of:

identifying a plurality of user interface methods, each user interface method being arranged for selecting a first function in an application program;

recording usage data representing use of each user interface method;

analyzing the usage data so as to identify the frequency of use of each user interface method; and maintaining the most frequently used user interface method in the interface and removing one or more less frequently used user interface methods in the interface.

BRIEF DESCRIPTION OF THE DRAWINGS

Embodiments of the invention will now be described, by way of example only, with reference to the accompanying drawings in which:

FIG. 3 is a table illustrating data used by the UI manager of FIG. 2.

DETAILED DESCRIPTION OF EMBODIMENTS OF THE INVENTION

Figure 1:
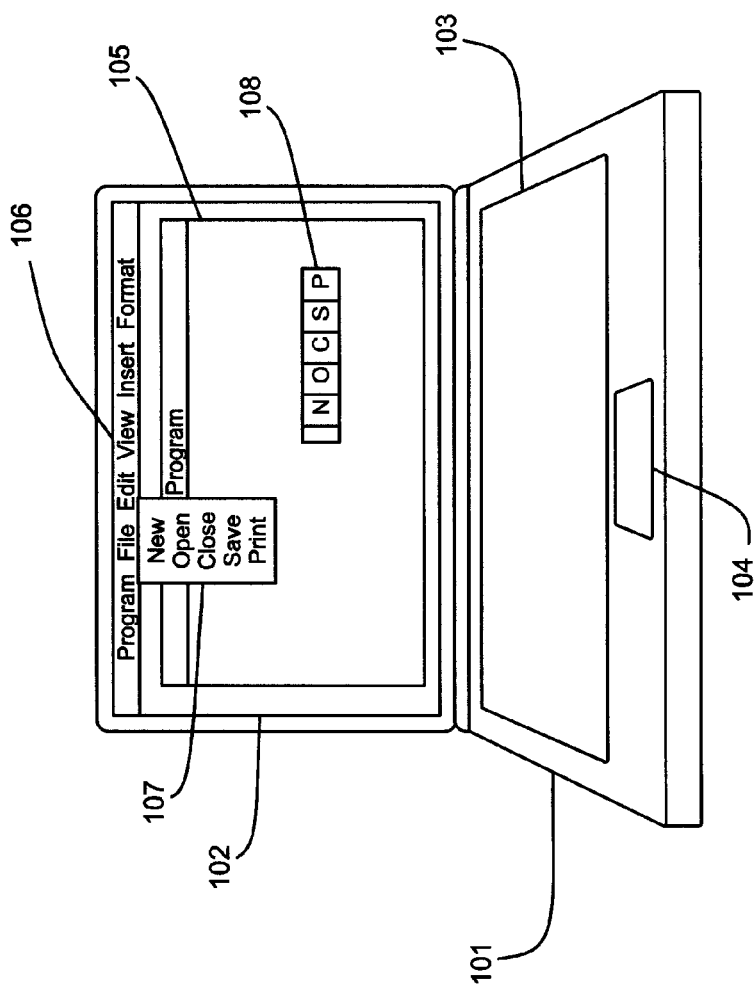
FIG. 1 is a schematic illustration of a computer running an application program comprising a user interface.

With reference to FIG. 1, a computer 101 comprises an output device in the form of a display 102 and input devices in the form of a keyboard 103 and a pointing device 104 in the form of a track or touch pad. The keyboard 103 and pointing device 104 enable user interaction with the computer 101 in the form of user input. The display 102 displays an application program window 105 for an application program (not shown) running on the computer 101. In the present embodiment, the window 105 is displayed in association with a menu bar 106, comprising a set of drop-down menus 107, and a toolbar 108. The drop-down menus 107 and the toolbar 108 each provide methods of activating specific functions of the application program. In addition, in the present embodiment, the application is responsive to a predetermined set of key combinations from the keyboard 103. Such key combinations are commonly referred to as keyboard shortcuts, with each such shortcut activating a specific function of the application program.

Thus, in the present embodiment, three different methods, that is, menu, toolbar and shortcut, are provided for interacting with the application program by activating its available functions. In the present embodiment, the file menu 107 comprises five options for five functions. The toolbar 108 also comprises five options for the same five functions as the file menu 107. Furthermore, the set of shortcuts available via the keyboard 103 comprises shortcuts for the same five functions as both the file menu 107 and the toolbar 108. This set of shortcuts use a simultaneous combination of the control key (ctrl) and a predetermined letter key and correspond to the options of the file menu 107 as follows:
ctrl & n=New;
ctrl & o=Open;
ctrl & c=Close;
ctrl & s=Save; and
ctrl & p=Print.

Figure 2:
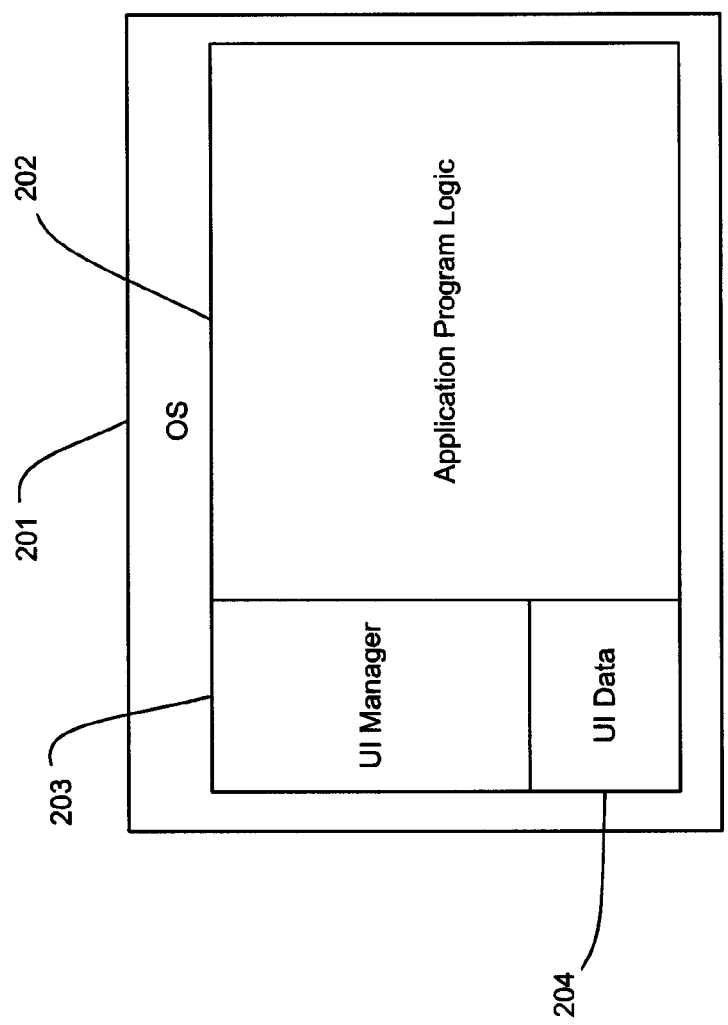
FIG. 2 is a schematic illustration of components of the application program of FIG. 1, including a user interface (UI) manager.

With reference to FIG. 2, the computer 101 is loaded with an operating system 201 arranged to provide a platform for running one or more application programs such as the application program 202 described above. In the present embodiment, the application program is augmented with additional functionality in the form of a user interface (UI) manager module 203. The UI manager 203 creates and utilises a set of UI data 204. The UI manager 203 is arranged to monitor use of the user interface of the application program 202 and to record the use of one or more predetermined sets of methods, that is, menu, toolbar and shortcut methods, for activating associated functions.

Each predetermined set of methods and their corresponding function is recorded in the UI data 204 as shown in FIG. 3. For each function 301, a corresponding method 302 is recorded. Thus where three methods 302 are provided for a given function 301, three sets of data are recorded in the UI data 204. Each data set is represented as a line in the table of FIG. 3. Each data set further comprises an age data element 303, a uses data element 304 and an active data element 305. In the present embodiment, the function 301 and method 302 data elements are provided in the UI data on installation of the application program 202 on the computer 101. Thus the function 301 and method 302 data define all available functions 301 of the application program 202 that have multiple methods 302 of activation. The age 303, uses 304 and active 305 data for each data set is created during the operation of the application program 202 as described in further detail below.

In the present embodiment, the UI methods 302 are all active at the first start up of the application program 202. Subsequently, UI methods 302 may be made inactive or reactivated with the exception of the keyboard shortcuts, which, in the present embodiment, remain permanently active. The current status of any given UI method 302 is recorded in the corresponding active data element 305. The activation and deactivation of a given method 302 is controlled by the UI manager 203 on the basis of the age 303 and uses data 304. The age data 303 is a record of the usage of a given method 302, that is, the number of times the method 302 has been active in the UI of the application program 202. The uses data 304 is a record of the number of times the corresponding method 302 has been used since active in the UI of the application program 202. The UI manager 203 is arranged to record and monitor the age 303 and user 304 data and to calculate the frequency of use of each method 302. The frequency of use is then used to determine which method 302 for a given function 301 is most frequently used. In the present embodiment, the UI manager 203 is then arranged to activate the most frequently used method 302 and, where possible, to deactivate the less frequently used methods 302. If a keyboard shortcut is the most frequently used method 302 then the remaining methods will be deactivated. If however, either the menu or toolbar method is the most frequently used method 302 then that method 302 will be activated in conjunction with the permanently active keyboard shortcut. In other words, the graphical elements of the UI may be activated or deactivated while the non-graphical elements are always active. The resulting status of each method 302 is recorded in the corresponding active data element 305. In the present embodiment the UI manager 203 is arranged to recalculate the frequency of use of a set of methods 302 for a given function 301 each time any one of the methods 302 for that function 301 is used. The UI manager calculates the frequency of use F as follows:

F=Uses/Age

Thus, as can be seen in the table of FIG. 3, for the save function 301, all three methods 302 have the same age data but the menu method 302 has the most uses. This will result in a calculated frequency of 5/3=1.67 compared to frequencies of 1/3=0.33 for the shortcut method 302 and 2/3=0.67 for the toolbar method 302. As a result, UI manager 203 has changed the status of the less frequently used toolbar method to inactive in the table of FIG. 3. Furthermore, in response to the toolbar method 302 being designated as inactive, it is removed from the UI for the application program 202. In other words, the save option will not be present in the toolbar 108. The only remaining methods 302 for accessing the save function 301 is the most frequently used method, that is, via the drop down file menu 107 and the keyboard shortcut. Similarly, for the print function 301, the most frequently used method 302 is the shortcut method 302 with a frequency of 5 and is thus the only active method 302, with both the menus and toolbar methods 302 being removed from the UI.

In the present embodiment, the UI data 204 is available to the user for editing via the preferences of the application program. The user is permitted to activate or deactivate one or more methods 302 and to add or remove functions or methods in the UI data 204. Thus the user is able to activate methods that may have been automatically deactivated, remove selected methods or functions so as to exclude them from the process or to add methods or functions so as to be included in the process.

Figure 4:
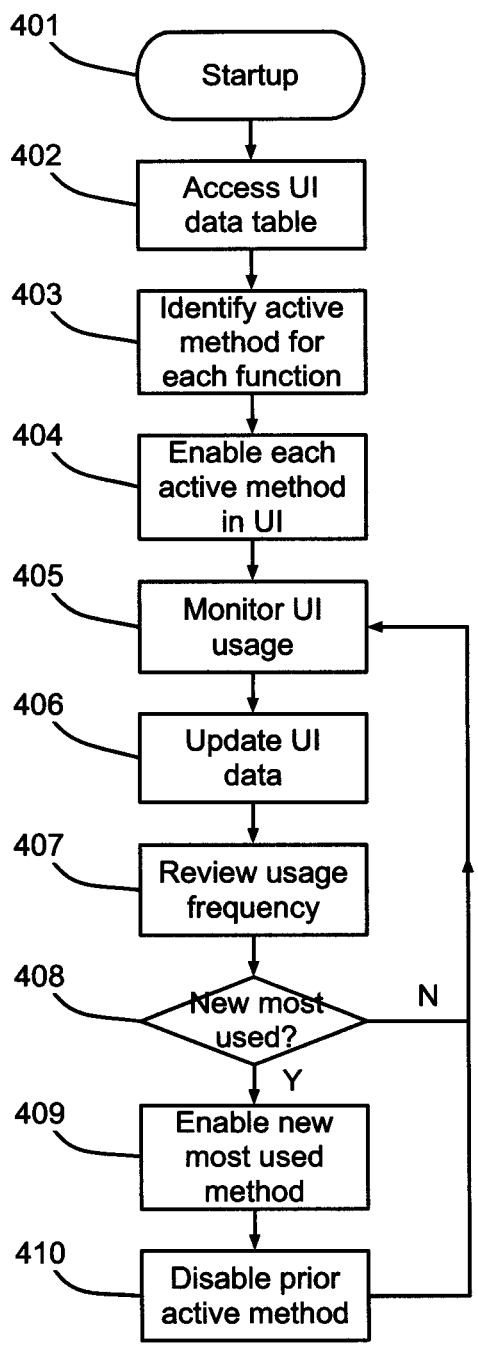
FIG. 4 is a flow chart illustrating the processing performed by the UI manager of FIG. 2.

The processing performed by the UI manager 203 when managing the UI for the application program 202 will now be described in further detail with reference to the flow chart of FIG. 4. At step 401, processing is initiated in response to the start up of the application program 202 and processing moves to step 402. At step 402, the UI data 204 is identified and accessed and processing moves to step 403. At step 403, the active and permanently active methods 302 for each listed function 301 are identified and processing moves to step 404. At step 404, each active method 302 is enabled in the UI and the inactive methods 303 removed or disabled and processing moves to step 405. At step 405, the use of the UI is monitored for use and in response to detected use processing moves to step 406. At step 406, the UI data 204 is updated with the detected use and processing moves to step 407. At step 407, in response to the updated usage data for the relevant function, the frequency of use for each associated method 302 is calculated and processing moves to step 408. At step 408, if a currently inactive method 302 has become the most frequently used then processing moves to step 409. At step 409, the new most frequently used method 302 is activated in the UI and processing moves to step 410. At step 410, unless the previous most frequently used method 302 is designated as always active, then it is deactivated in the UI and processing returns to step 405 and proceeds as described above. If at step 408, the current most frequently used method 302 remains the most frequently used method 302 then processing returns to step 405 and proceeds as described above. Processing ends when the application program 202 shuts down during which process the UI manager 203 is arranged to increment the age data 303 for each data set in the UI data 204.

Embodiments of the invention thus enable more efficient use of the graphical elements of the UI since space in menus or toolbars that may otherwise be occupied with unused methods can be freed up. Removal of such redundant methods is likely to make the UI easier or quicker to use since the user does not need to search among unused options for the required option. The UI space that is freed up in the above process is also available for a user to insert methods into the UI. For example, freed space on a toolbar enables a user to select further functions for inclusion on the toolbar.

In another embodiment, the UI manager is arranged to identify functionality of the application program that is either unused or underutilised via a given method and expose that function via an alternative one of the UI facilities. For example, a function buried deep in nested menus may be deactivated in that method and activated in a toolbar. As will be understood by those in the art, underutilisation would be determined in accordance with a predetermined metric.

As will be understood by those in the art, the activation and deactivation may be automatic with no user interaction or may be semi-automatic where a user could confirm whether each method should be activated or deactivated, thus allowing the user to retain control over this aspect of the UI.

As will be understood by those in the art, when a user manually reactivates a given method, the uses data for that method will be reset to zero. As will be understood by those in the art, any suitable metric of determining the most frequently used method of activating a given function may be employed. For example, the metric may be based on uses only. Different metrics may be applied to different sets of one or more functions or methods. If user manually adds method in, the relevant method may be either automatically or optionally promoted to most frequently used and thus activated.

In another embodiment, a predetermined proportion of the most frequently used methods are activated or a predetermined proportion of the least frequently used methods are deactivated. In a further embodiment, a predetermined number of the most frequently used methods are activated or a predetermined number of the least frequently used methods are deactivated. In another embodiment, methods having a frequency of use above a predetermined threshold are activated or methods having a frequency of use below a predetermined threshold are deactivated.

In another embodiment, the updating of the use data is decoupled from the recalculation of the frequency of use data. In other words, the frequency of use data is refreshed periodically such as automatically each time the application is use, every 30 minutes or manually. As will be understood by those in the art, a delay is necessary when an application is first used before processing the frequency of use so as to enable initial UI data to be collected. The delay may be determined by a predetermine time period elapsing or a predetermined body of data being collected.

As will be understood by those in the art, any suitable method of indicating the activation of a given function may be used, such as touch gestures on touch screen or track pad, or other indications input via other suitable input devices such as a pen tablet or camera.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the scope of applicant's general inventive concept.

What is claimed is:

1. A method for managing a user interface for an application program, said method comprising the steps of:
   identifying a plurality of user interface methods comprising a first selection method having a plurality of associated first commands and a second selection method having a plurality of associated second commands, each user interface method being arranged for selecting a first function in the application program;
   recording usage data representing use of each said user interface method;
   analyzing said usage data so as to identify the frequency of use of each said user interface method; and
   maintaining the most frequently used user interface method in said interface and removing one or more less frequently used user interface methods in said interface, wherein the first selection method is a menu bar having a plurality of selectable actions associated therewith, where each action of the plurality of selectable actions has an associated drop down menu containing at least one of the first commands, and the second selection method is a tool bar containing the second commands.

2. The method according to claim 1 wherein said plurality of user interface methods comprises one or more non-graphical user interface methods that are not invoked using a graphical user interface and are permanently maintained in said user interface.

3. The method according to claim 1 wherein a predetermined body of usage data is recorded prior to enabling said analyzing of said usage data and said maintaining of said the most frequently used user interface method.

4. The method according to claim 1 wherein said usage data is recorded for a predetermined period prior to enabling said analyzing of said usage data and said maintaining of said the most frequently used user interface method.

5. The method according to claim 1 where said analyzing of said usage data and said maintaining of said the most frequently used user interface method is performed automatically on start up of said application program.

6. The method according to claim 1 wherein said frequency of use is determined by the average uses of a given user interface method per use of said application program.

7. A computer program stored on a non-transitory computer readable device and loadable into an internal memory of a computer, comprising software code portions, when said computer program is run on the computer, for performing the method of claim 1.

8. An apparatus for managing a user interface for an application program, comprising:
   a processor coupled to a memory, and program instructions loadable into the memory for execution by the processor to configure the apparatus to perform steps of:
   identify a plurality of user interface methods comprising a first selection method having a plurality of associated first commands and a second selection method having a plurality of associated second commands, each user interface method being arranged for selecting a first function in an application program;

record usage data representing use of each said user interface method;

analyze said usage data so as to identify the frequency of use of each said user interface method; and maintain the most frequently used user interface method in said interface and remove one or more less frequently used user interface methods in said interface, wherein the first selection method is a menu bar having a plurality of selectable actions associated therewith, where each action of the plurality of selectable actions has an associated drop down menu containing at least one of the first commands, and the second selection method is a tool bar containing the second commands.

9. The apparatus according to claim 8 wherein said plurality of user interface methods comprises one or more non-graphical user interface methods that are not invoked using a graphical user interface and are permanently maintained in said user interface.

10. The apparatus according to claim 8 wherein a predetermined body of usage data is recorded prior to enabling said analyzing of said usage data and said maintaining of said the most frequently used user interface method.

11. The apparatus according to claim 8 wherein said usage data is recorded for a predetermined period prior to enabling said analyzing of said usage data and said maintaining of said the most frequently used user interface method.

12. The apparatus according to claim 8 wherein said analysis of said usage data and said maintenance of said the most frequently used user interface method is performed automatically on start up of said application program.

13. The apparatus according to claim 8 wherein said analysis of said usage data and said maintenance of said the most frequently used user interface method is performed periodically during the operation of said application program.

* * * * *